United States Patent
Koshiba et al.

(10) Patent No.: US 7,412,002 B2
(45) Date of Patent: Aug. 12, 2008

(54) IMAGE PREPROCESSING WITH SELECTIVE LOWPASS FILTERING FROM MOTION COMPENSATION

(75) Inventors: Osamu Koshiba, Ibaraki (JP); Satoru Yamauchi, Tsukuba (JP)

(73) Assignee: Texas Instruments Incorporated, Dallas, TX (US)

( * ) Notice: Subject to any disclaimer, the term of this patent is extended or adjusted under 35 U.S.C. 154(b) by 1516 days.

(21) Appl. No.: 09/842,955

(22) Filed: Apr. 25, 2001

(65) Prior Publication Data

US 2001/0048720 A1    Dec. 6, 2001

Related U.S. Application Data

(60) Provisional application No. 60/200,828, filed on Apr. 28, 2000.

(51) Int. Cl.
*H04B 1/66* (2006.01)
*H04N 7/12* (2006.01)
*H04N 7/26* (2006.01)

(52) U.S. Cl. ............................................. 375/240.16

(58) Field of Classification Search ............. 375/240.12, 375/240.13, 240.14, 240.15, 240.16, 240.17, 375/240.29, 240.18; 348/699–700; 382/236, 382/238; 386/109, 111; *H04B 1/66; H04N 7/12, H04N 7/26*
See application file for complete search history.

(56) References Cited

U.S. PATENT DOCUMENTS

| | | | | |
|---|---|---|---|---|
| 5,477,272 A | * | 12/1995 | Zhang et al. | 375/240.06 |
| 5,502,510 A | * | 3/1996 | Kim et al. | 348/701 |
| 5,592,226 A | * | 1/1997 | Lee et al. | 375/240.14 |
| 5,990,962 A | * | 11/1999 | Ueno et al. | 375/240.16 |
| 6,037,986 A | * | 3/2000 | Zhang et al. | 375/240.12 |
| 6,396,876 B1 | * | 5/2002 | Babonneau et al. | 375/240.29 |
| 6,434,196 B1 | * | 8/2002 | Sethuraman et al. | 375/240.12 |
| 6,560,371 B1 | * | 5/2003 | Song et al. | 382/240 |

OTHER PUBLICATIONS

Ke Shen, "Video preprocessing techniques for real-time video compression-noise level estimation techniques", 42nd Midwest Symposium on Circuits and Systems, vol. 2, pp. 778-781, Aug. 1999.*

Li Yan, "Noise reduction for MPEG type of codec", IEEE International Conference on Acoustics, Speech, and Signal Processin vol. 5, pp. 429-432, Apr. 1994.*

Chiu, Y. J., "A perceptual preprocessor to segment video for motion estimation" Proceedings Data Compression Conference, p. 534, Apr. 1998.*

* cited by examiner

*Primary Examiner*—Tung Vo
(74) *Attorney, Agent, or Firm*—Mirna G. Abyad; Wade J. Brady, III; Frederick J. Telecky, Jr.

(57) ABSTRACT

Preprocessing for motion-compensated video encoding such as MPEG includes lowpass filtering, temporal (310) and/or spatial (312), locally per pixel in response to motion vector analysis and prediction error (304) and temporal change (306). This de-emphasizes image areas of rapid change which corresponds to human perception de-emphasis.

6 Claims, 5 Drawing Sheets

US 7,412,002 B2

IMAGE PREPROCESSING WITH SELECTIVE LOWPASS FILTERING FROM MOTION COMPENSATION

CROSS-REFERENCE TO RELATED APPLICATIONS

This application claims priority from U.S. provisional patent applications Ser. No. 60/200,828, filed Apr. 28, 2000.

BACKGROUND OF THE INVENTION

The invention relates to electronic image methods and devices, and, more particularly, to digital communication and storage systems with compressed images.

Video communication (television, teleconferencing, Internet, digital camera, and so forth) typically transmits a stream of video frames (pictures, images) along with audio over a transmission channel for real time viewing and listening or storage. However, transmission channels frequently add corrupting noise and have limited bandwidth. Consequently, digital video transmission with compression enjoys widespread use. In particular, various standards for compression of digital video have emerged and include the various JPEG and MPEG standards.

Tekalp, Digital Video Processing (Prentice Hall 1995), Clarke, Digital Compression of Still Images and Video (Academic Press 1995), and Schafer et al, Digital Video Coding Standards and Their Role in Video Communications, 83 Proc. IEEE 907 (1995), include summaries of various compression methods, including descriptions of the JPEG, H.261, MPEG-1, and MPEG-2 standards For encoding a single frame as in JPEG or an I frame in MPEG, Shapiro, Embedded Image Coding Using Zerotrees of Wavelet Coefficients, 41 IEEE Tr.Sig.Proc 3445 (1993) provides a wavelet hierarchical subband decomposition which groups wavelet coefficients at different scales and predicts zero coefficients across scales. This provides a quantization and fully embedded bitstream in the sense that the bitstream of a lower bitrate is embedded in the bitstream of higher bitrates.

Further compression can be achieved by segmenting a picture into subjectively important regions and unimportant regions and then reducing the number of information bits used for the unimportant regions. The segmenting into regions is a preprocessing operation as illustrated in FIG. 1; see Yoshihisa Yamada, Masahide Kaneko, Hiroshi Harashima: "MPEG Encoding Simulator for Enhancing the Image Quality by Manual Operation," 1996 ITE Annual Convention, 23-5. In particular, functional block A partitions a frame (picture) into and combines regions. The method of extracting regions in an I picture is a manual processing operation, and in P and B pictures, manual processing operations only adjust detail point of results. Functional block B selects a type of preprocessing and sets up parameters for quantization in each region. Functional block C preprocesses by, such as, low pass filtering regions which an operator considers as needless. Several types of filter with different bandwidths are prepared and block C is able to choose one of them according to the importance of the region. Functional block D applies MPEG coding with quantization steps determined in each region.

One aspect of preprocessing by manual operation is that an operator can partition regions as he or she likes; however, the other aspect is that it takes time to operate so that it is not suitable for realtime MPEG encoding and that manual operation may cause inaccurate region segmentation. For example, FIG. 2 shows an image with a center of human which can be considered as subjectively important object. Therefore, we should partition the region between human and his background. However, the region boundary is extremely complex so that it is difficult to partition accurately. Even if the region is partitioned as blocks including its boundaries, it may cause noticeable block distortion. Therefore, it is difficult for this method to preprocess images such as this example.

Hardware and software implementations of JPEG, H.261, MPEG-1, and MPEG-2 compression and decoding exist. Further, programmable microprocessors or digital signal processors, such as the Ultrasparc or TMS320C6xxx, running appropriate software can handle most compression and decoding in real time, and less powerful processors may handle lower bitrate compression and decompression.

SUMMARY OF THE INVENTION

The present invention provides a preprocessing for a video sequence prior to motion compensation encoding with filtering in response to the temporal and spatial neighborhoods of a pixel and the motion compensation of the pixel's macroblock.

This has advantages including the control of preprocessing at each pixel in realtime to improve picture quality of MPEG or other motion compensated encoded and decoded images

BRIEF DESCRIPTION OF THE DRAWINGS

The figures are heuristic for clarity.

DESCRIPTION OF THE PREFERRED EMBODIMENTS

1. First Preferred Embodiment

Figure 1:
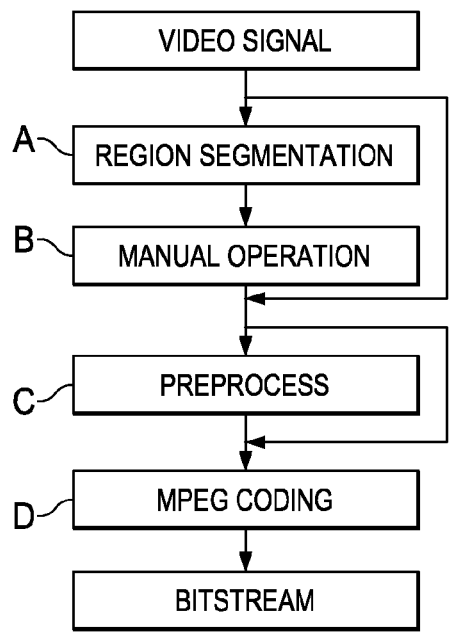
FIG. 1 shows known MPEG preprocessing.
Figure 2:
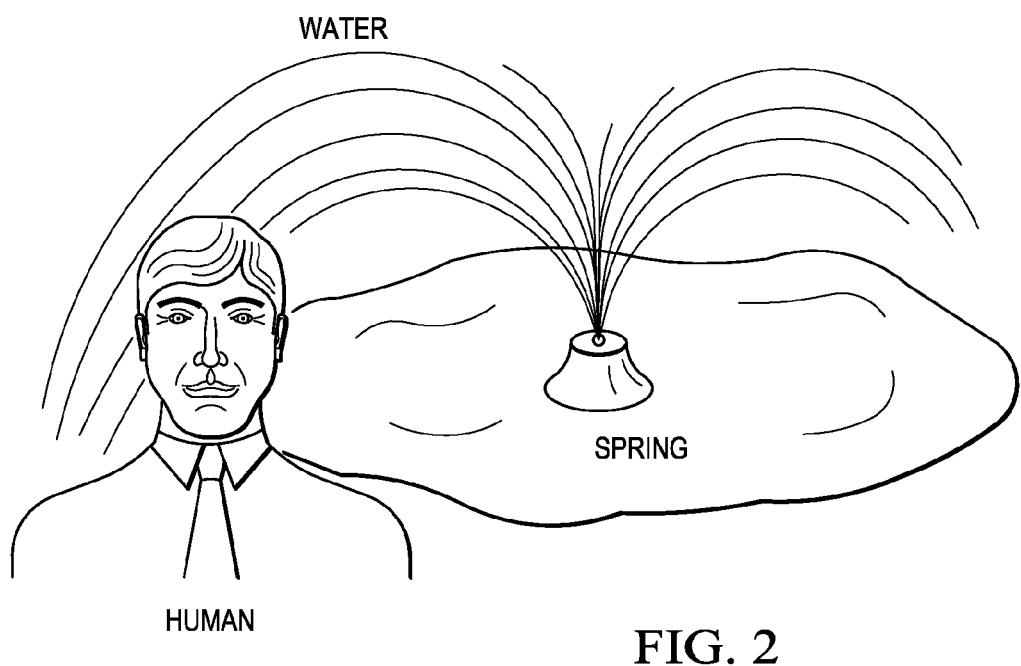
FIG. 2 illustrates a picture with regions of differing importance.
Figure 3:
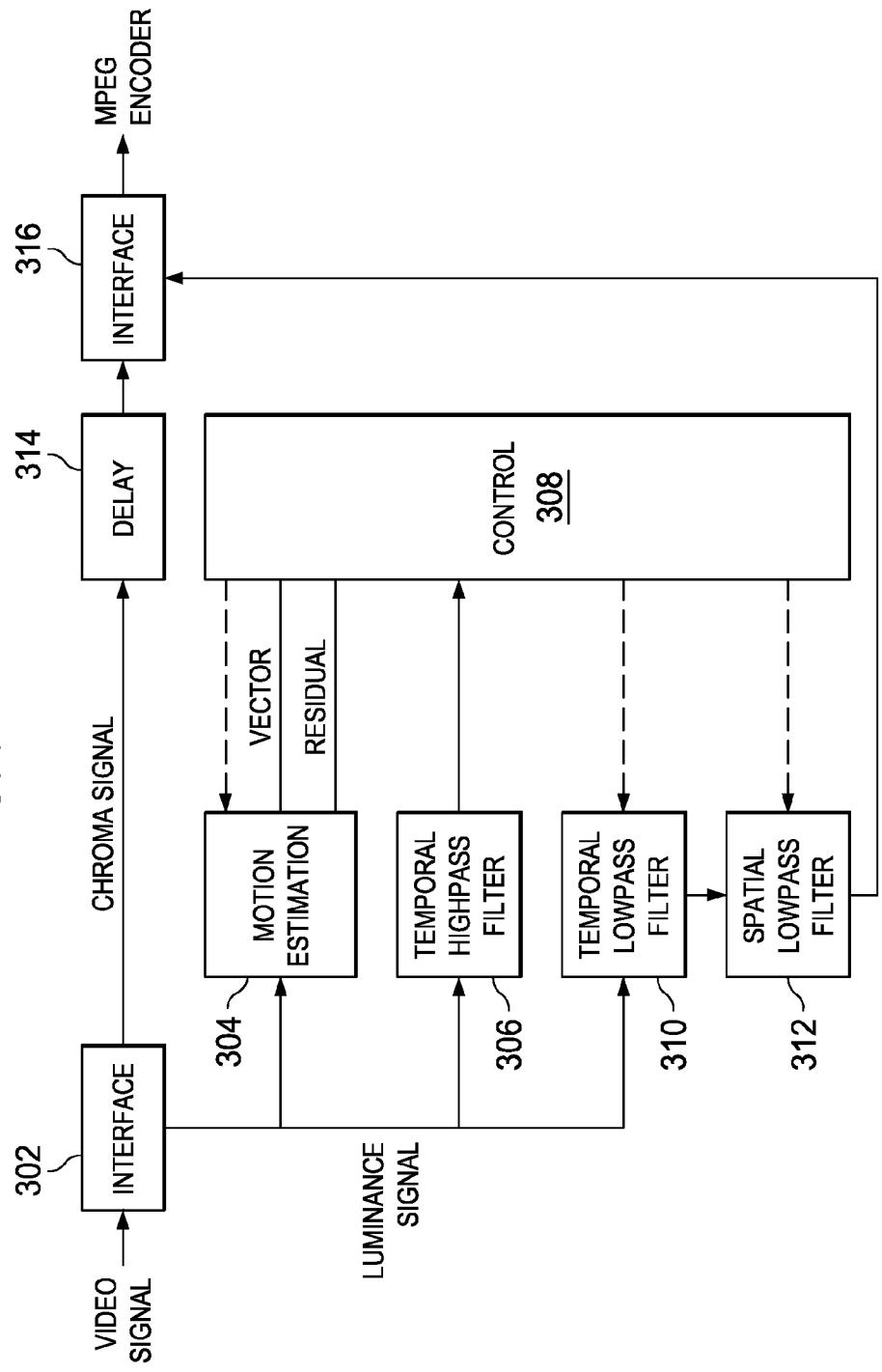
FIG. 3 is a block diagram of a preferred embodiment preprocessor.

FIG. 3 illustrates a first preferred embodiment MPEG encoding preprocessing method which proceeds as follows. Input video signal (luminance plus chroma for a frame) enters interface functional block 302 which sends luminance signal and chroma signal to different blocks. Motion estimation functional block 304 receives luminance signal for the input frame and for each macroblock of the input frame outputs a motion vector and motion estimation residual just as in standard MPEG encoding; the output motion vector and residual are inputs for control block 308. Temporal difference detection functional block 306 calculates temporal difference in the luminance signal Y (i.e., difference of current input frame and the prior input frame) and outputs the difference for each pixel to control block 308. Control block 308 controls adaptive filters 310 and 312 plus motion estimation block 304. Filter 310 is a temporal low pass filter and filter 312 is a two-dimensional filter according to temporal differences, motion vectors, and motion estimation residuals. In particular, functional block 310 is a temporal low pass filter which filters in response to control signals from 308. Functional block 308 is a two-dimensional spatial low pass filter; it selects a two-dimensional filter according to size and direction of the motion vector. Functional block 314 delays chroma signal to synchronize it with luminance signal Y.

Functional block H is an interface, which sends luminance signal Y and chroma signal to MPEG encoder. The net effect of this preprocessing is the filtering of the luminance signal Y by temporal low pass filter 310 and spatial low pass filter 312 prior to a standard MPEG encoding. The low pass filtering adapts to the macroblock being filtered, and in this manner the unimportant regions can be effectively simplified.

Control block 308 operates to control filters 310 and 312 as follows. Control block 308 uses three kinds of parameters to control filters 310 and 312: Motion vector $v=(v_x, v_y)$ and motion estimation residual MR from Motion estimation block 304 plus temporal difference TD from temporal high pass filter 306. With respect to motion estimation residual MR (the difference between the pixel value and the predicted pixel value from the reference macroblock of the prior frame defined by the motion vector), predetermine a threshold of prediction error in advance in order that MR falls into one of three results: small, medium, or large. Control block 308 contains thresholds $T_A$, $T_B$, $T_C$, and $T_D$ for the motion vector and threshold $T_T$ for temporal difference; these thresholds and the prediction error levels for small-medium and medium-large are programmed by the user. Then proceed as follows for each pixel of an input frame.

First consider the temporal difference TD and proceed as follows:

1. If $TD \leq T_T$, then the pixel can be considered as stationary in time and control blocks 310 and 312 to omit any filtering.
2. If $TD > T_T$, then consider the motion estimation residual MR at the pixel.

For this case 2, in the motion estimation residual MR of the macroblock including the pixel under consideration:

3. If MR is small, then the motion prediction can be considered correct, so control blocks 310 and 312 to omit any filtering.
4. If MR is large, then the motion prediction is not very reliable, so control blocks 310 and 312 to apply a narrow bandwidth lowpass filter.
5. If MR is medium, then consider the motion vector v.

Figure 4:
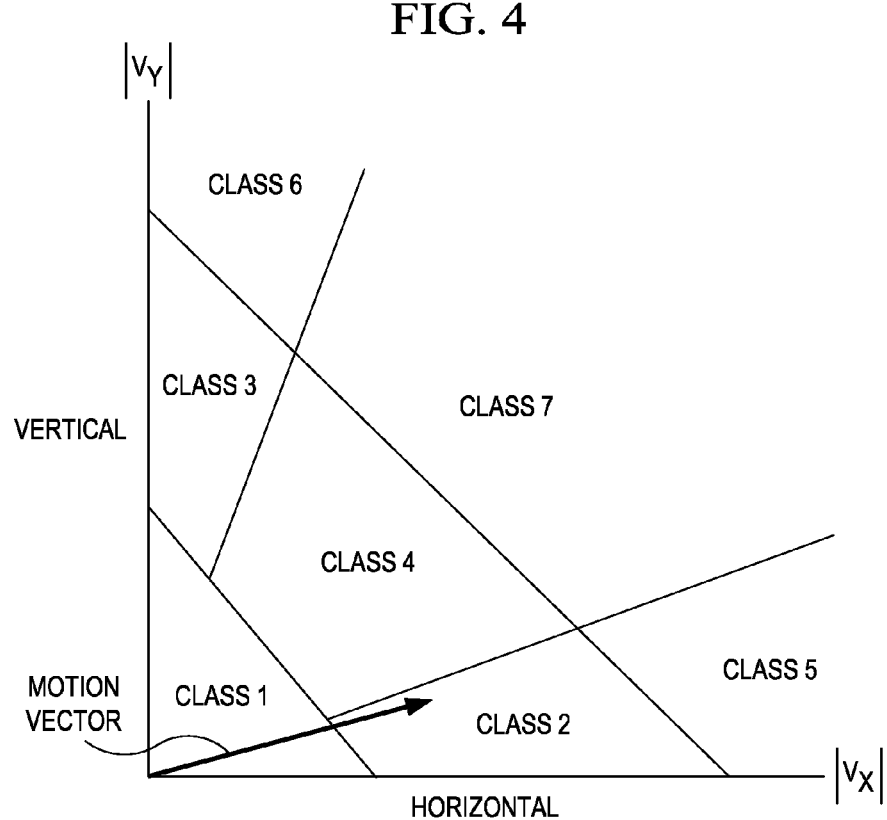
FIG. 4 shows motion vector decision regions.

For this case 5, control block 308 classifies the motion vector $v=(v_x, v_y)$ for the macroblock which includes the pixel under consideration into seven regions according to the motion vector size and direction as shown in FIG. 4:

If $|v_x|+|v_y| \leq T_A$, then control block 312 to process a filter of class 1 (no filter)

Else if $|v_x|+|v_y| \leq T_B$ and $T_C|v_x| \geq |v_y|$, then control block 312 to a filter of class 2.

Else if $|v_x|+|v_y| \leq T_B$ and $T_D|v_x| \leq |v_y|$, then control block 312 to a filter of class 3.

Else if $|v_x|+|v_y| \leq T_B$, then control block 312 to apply a filter of class 4.

Else if $T_C|v_x| \geq |v_y|$, then control block 312 to apply a filter of class 5.

Else if $T_D|v_x| \leq |v_y|$, then control block 312 to apply a filter of class 6.

Else, then control 312 to apply a filter of class 7.

The filters for the classes are as follows: class 1: no filter; class 2: spatial filter with narrow band lowpass only in x direction; class 3: spatial filter with narrow band lowpass only in y direction; class 4: spatial filter with narrow band lowpass in both x and y directions; class 5: same as class 2 but with narrower band; class 6: same as class 3 but with narrower band; and class 7: same as class 4 but with narrower band in both directions.

The spatial lowpass filters could be separable (a two-dimensional filter kernel equal to the product of an x-direction one-dimensional filter kernel and a y-direction one-dimensional filter kernel). And an example of a narrow band lowpass one-dimensional filter kernel could be the five-tap kernel −1/8, 2/8, 6/8, 2/8, −1/8 and an example of a narrower band lowpass one-dimensional filter kernel could be the nine-tap kernel −1/15, 0, 2/15, 4/15, 5/15, 4/15, 2/15, 0, −1/15. Of course, all sorts of other filter kernels could be used, such as the simple kernels of 1/N, 1/N, . . . , 1/N, with increasing N yielding progressively narrower bands. The temporal lowpass filter is just a one-dimensional filter and could be a simple kernel such as the three-tap 1/4, 2/4, 1/4 or two-tap 1/2, 1/2 or any of the one-dimensional kernels of the spatial filters.

For FIG. 4 the thresholds $T_C$ and $T_D$ are roughly 1/4 and 4, respectively, and the motion vector magnitude thresholds $T_A$ and $T_B$ could be 3-5 (pixel intervals) and 5-10, respectively. For luminance values in the range 0-255 the temporal threshold $T_T$ could be on the order of 5. A small MR could be (for luminance values in the range 0-255) less than on the order of 5 and large if greater than on the order of 50. Of course, all of these thresholds and sizes may be adjusted in response to the perceived quality and bits saved of various types of video sequences of interest.

Figure 5A:
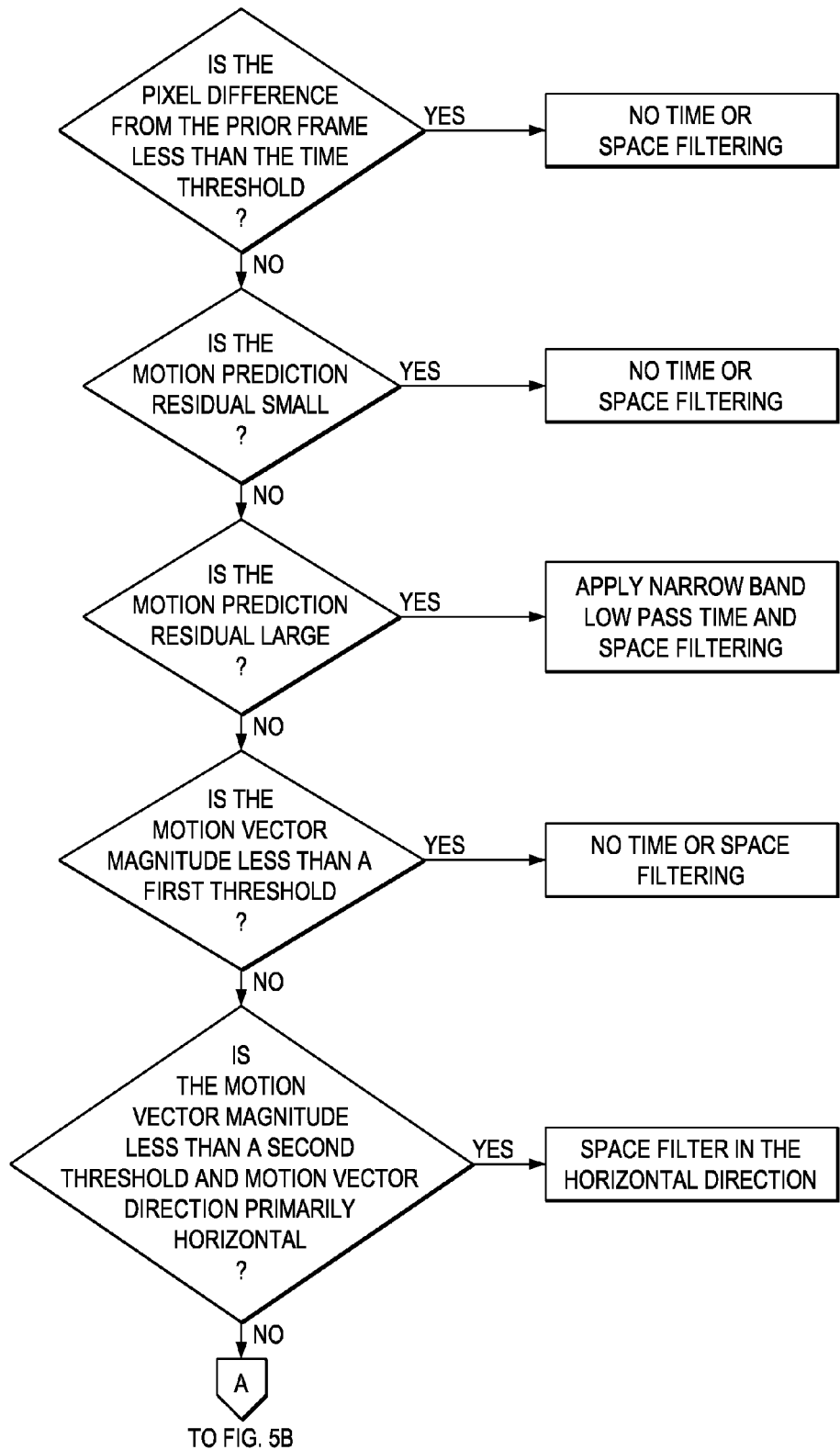
FIG. 5 is a flow diagram.
Figure 5B:
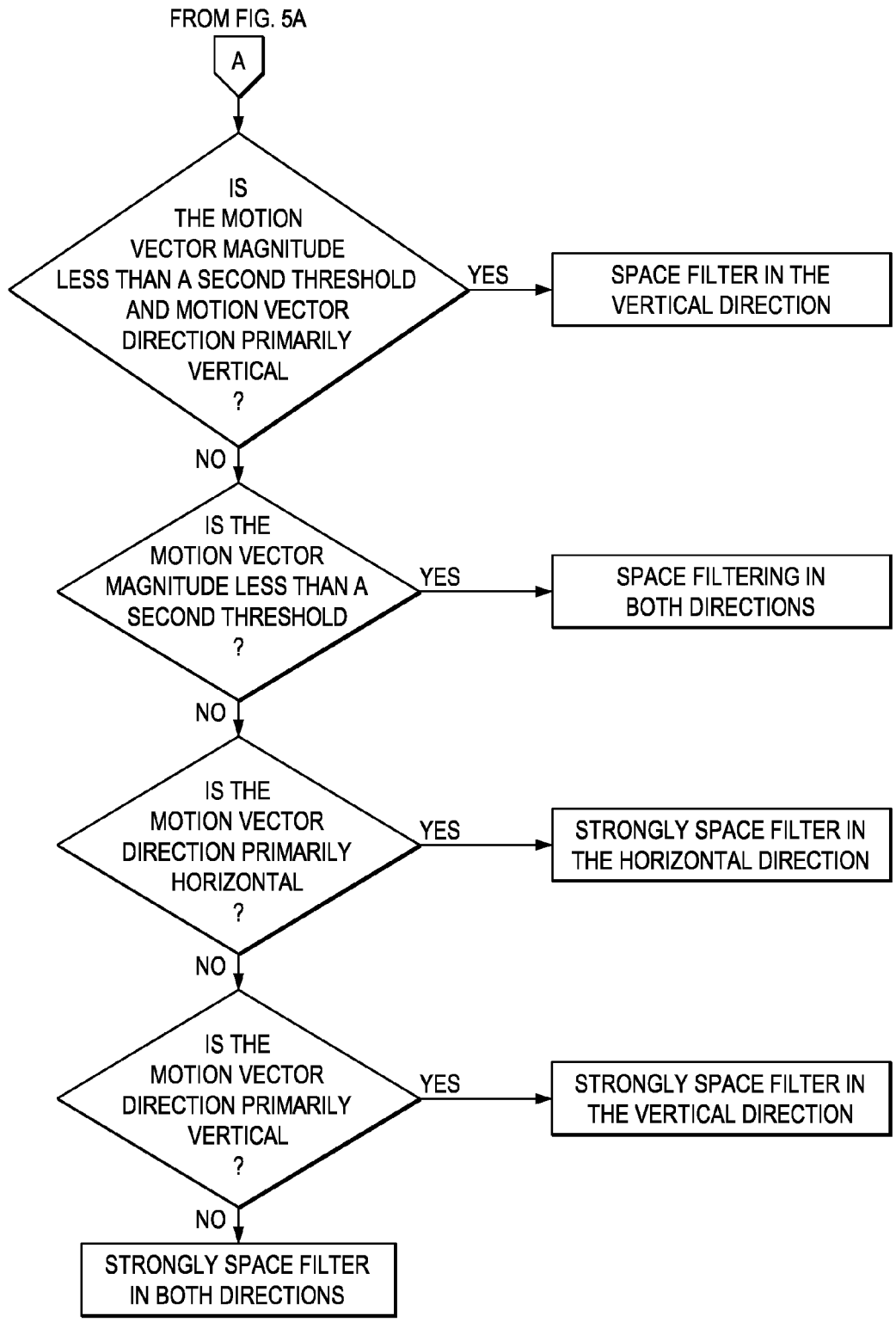

FIG. 5 illustrates the decision flow for the division of the motion vector magnitude into three classes and as in FIG. 4. In FIG. 5 the "strong" filtering is narrower band than the other filterings.

2. Illustration

As an illustration of the effects of the time and space filterings, first consider case of the motion vector falling into class 2 as shown in FIG. 4. This implies that the pixel's object is moving in a horizontal direction. Therefore, in this case, apply a two-dimensional lowpass filter with narrow bandwidth only in the horizontal direction. Analogously, in the case of the motion vector falling into class 5, apply a lowpass filter with horizontal bandwidth narrower than that for a class 2 motion vector pixel. In this design, the fact is used that human visual response becomes more inaccurate as an object moves faster. As for filters for pixels with motion vectors falling into class 4 and class 7, which indicate the object moves in diagonal directions, apply lowpass filters with especially narrower bandwidths because human visual system is less sensitive in diagonal directions as compared to horizontal and vertical direction even if the spatial frequency responses are the same.

In this way, the control block 308 enables the filtering of each pixel independently using parameters such as the temporal difference TD, the motion estimation residual MR, and the motion vector v through the temporal filter 310 and the two-dimensional filter 312 which make use of human visual system characteristics. Therefore, the preferred embodiment preprocessing can reduce information bits effectively, which allows for enhanced picture quality of MPEG and other motion compensated encoded and decoded images.

3. Modifications

The preferred embodiments may be varied while retaining the feature of pixel based preprocessing adapted to a pixel's temporal and/or spatial neighborhood.

For example, the temporal difference detection may be omitted and the pixel neighborhood analysis started with the motion prediction error (residual); the motion vector magnitude could be measured by the sum of squares of the components or any analogous vector norm rather than the sum of absolute values; the threshold values could be varied according to frame parameters such as quantization level; the number of regions for classifying the motion vector could be increased or decreased, such as only four regions: small magnitude, primarily horizontal, primarily vertical, and diagonal; the inequalities used for decisions could be a mixture of (i) "less than" or (ii) "less than or equal to" and (iii) "greater than" or "greater than or equal to", . . .

What is claimed is:

1. A method of preprocessing for motion-compensated video encoding, comprising:
   (a) providing a frame in a video sequence for motion-compensated encoding;
   (b) for a pixel in said frame, comparing a difference between (i) the value of said pixel and (ii) the predicted value of said pixel from motion compensation prediction of said frame to a first level;
   (c) when said comparing of step (b) indicates said difference is greater than said first level, apply lowpass filtering to said pixel;
   (d) for said pixel, comparing said difference to a second level which is less than said first level;
   (e) when said comparing of step (d) indicates said difference is greater than said second level but less than or equal to said first level, comparing the magnitude of the motion vector for the block containing said pixel to a first threshold;
   (f) when said comparing of step (e) indicates the magnitude of said motion vector is greater than said first threshold, spatial lowpass filtering to said pixel;
   (g) repeating steps (b)-(f) for other pixels of said frame:
   (h) motion-compensated encoding of said frame after said filtering:
   (i) wherein said filtering of step (c) is both spatial in said frame and temporal over other frames of said video sequence.

2. The method of claim 1, wherein:
   (a) said spatial filtering of step (c) of claim 1 depends upon the direction of said motion vector.

3. A method of preprocessing for motion-compensated video encoding, comprising:
   (a) providing a frame in a video sequence for motion-compensated encoding;
   (b) for a pixel in said frame, comparing a first difference between (i) the value of said pixel and (ii) the value of said pixel in a frame prior to said frame to a temporal threshold;
   (c) when said comparing of step (b) indicates said first difference is greater than said temporal threshold, comparing a second difference between (i) the value of said pixel and (ii) the predicted value of said pixel from motion compensation prediction of said frame to a first level;
   (d) when said comparing of step (b) indicates said second difference is greater than said first level, apply lowpass filtering to said pixel; and
   (e) repeating steps (b)-(d) for other pixels of said frame;
   (f) motion-compensated encoding of said frame after said filtering.

4. The method of claim 3, wherein:
   (a) said filtering of step (d) of claim 3 is filtering is both spatial in said frame and temporal over other frames of said video sequence.

5. The method of claim 4, further comprising:
   (a) for said pixel, comparing said second difference to a second level which is less than said first level; and
   (b) when said comparing of step (a) indicates said second difference is greater than said second level but less than or equal to said first level, comparing the magnitude of the motion vector for the block containing said pixel to a first threshold;
   (c) when said comparing of step (b) indicates the magnitude of said motion vector is greater than said first threshold, spatial lowpass filtering to said pixel; and
   (d) wherein said step (f) of claim 3 encoding applies to said frame after filtering by both steps (b)-(e) of claim 3 and foregoing steps (a)-(c).

6. The method of claim 5, wherein:
   (a) said spatial filtering of step (c) of claim 5 depends upon the direction of said motion vector.

* * * * *